United States Patent Office 2,747,982
Patented May 29, 1956

---

2,747,982

METHOD AND COMPOSITION FOR THE CONTROL OF THE GROWTH OF VEGETATION

Dorsey R. Mussell, Clare, Mich., assignor to The Dow Chemical Company, Midland, Mich., a corporation of Delaware No Drawing. Application May 11, 1955, Serial No. 507,731

9 Claims. (Cl. 71—2.3)

This invention is concerned with the suppression of the growth of undesirable vegetation and is particularly directed to a composition and method for the control of the growth of germinant seeds, emerging seedlings and established plants of many undesirable weed species.

It is an object of the present invention to provide a new and improved method for the control of the growth of undesirable vegetation. A further object is to provide a method for the control of many undesirable weeds and particularly those of small seeded grasses in growth media planted with or supporting the growth of many species of cereal grains and broadleaf crop plants. Another object is the provision of a method for the control of the growth of seeds and emerging seedlings of undesirable annual grasses in growth media supporting the growth of established perennial grasses such as blue grass, bermuda grass and creeping red fescue. A further object is the provision of a method for the control of many small seeded grasses in soil which is planted to or supporting the growth of cotton or corn. An additional object is the provision of a novel composition adapted to be employed for the accomplishment of a new method of growth control. Other objects will become apparent from the following specification and claims.

According to the present invention it has been discovered that the growth of plants may be controlled by exposing a part of the growing plant to the action of the 4-halo-2,6-disecondarybutyl phenols of the formula

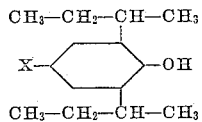

wherein X represents bromine or chlorine. More particularly, it has been discovered that the growth of germinant seeds, emerging seedlings and established vegetation may be suppressed by exposing the germinant seeds, seedlings or the roots or above-ground portions of the growing plants to the action of a growth-inhibiting amount of the above 4-halo-2,6-disecondarybutyl phenols. These compositions are liquids which are somewhat soluble in many common organic solvents and of very low solubility in water. They have been found to have a high toxicity against the germinant seeds and seedlings of many small seeded grasses. Thus, they may be employed for the selective control of small seeded grasses in growth media planted with or supporting the growth of many species of cereal grains or broadleaf crop plants such as corn and cotton. Further, the compounds have a low toxicity for established stands of perennial grasses when applied to their roots and foliage at dosages which will control the growth of the seeds, and seedlings of annual grasses. Thus, the compounds may be employed for the control of the growth of the seeds and seedlings of annual grasses in established turfs of perennial grasses such as blue grass, bermuda grass and creeping red fescue.

The exposure of growing plants and plant parts to the action of the 4-halo-2,6-disecondarybutyl phenols gives rise to varying degrees of response depending upon the nature of the plant or seed, the stage of growth or maturity of the plant, and the dosage at which the exposure is carried out as well as the weather conditions of temperature and moisture. When large dosages are applied to the foliage of plants a substantially complete kill of most plant species is obtained. The distribution of large dosages in growth media controls the growth of most germinant seeds, seedlings and established plants. This approaches a sterilizing action. The weathering action of sun and rain, and possibly the decomposition of the toxic compounds by the action of bacterial and other soil organisms eventually frees the growth media of the toxicants. Soil or foliar applications of more dilute dosages of the toxicant compounds suppress the growth of the germinant seeds of many small seeded grasses and/or the seedlings of such grasses while having little or no effect upon established stands or perennial grasses or upon the seeds, emerging seedlings or established plants of many cerial grains and broadleaf crop plants. Thus, the compounds may be employed for the selective control of the growth of the seeds and seedlings of small seeded grasses in plantings or stands of many cereal grains and broadleaf crop plants or for the control of the growth of the seeds and seedlings of annual grasses such as crab grass in established stands of perennial grasses.

The supplying of a growth-inhibiting amount of the 4-halo-2,6-disecondarybutyl phenols in the growth media or upon the above-ground surfaces of plants is essential and critical for the practice of the present invention. The exact dosage to be supplied is dependent upon the plant species to be controlled and the stage of growth thereof as well as the plant part to be contacted with the toxicants. In non-selective foliage treatments, good results are obtained when from 3 to 100 pounds of toxicant is applied per acre. In non-selective applications to growth media, good results are obtained when a dosage of toxicant is supplied in the amount of from about 10 to 200 parts or more by weight per million parts by weight of the media. In non-selective applications to soil, good results are obtained when the 4-halo-2,6-disecondarybutyl phenols are distributed at a rate of from about 1.5 to 200 pounds or more per acre and through such a cross section of the soil as to provide for the presence therein of an effective concentration of the treating agent. In such applications, it is desirable that the compound be distributed to a depth of at least 0.5 inch and at a substantially uniform dosage of at least 3 pounds per acre inch of soil. In selective applications to foliage for the control of many undesirable weeds, and especially the seedlings of small seeded grasses, in many cereal grains and broadleaf crop plants, a substantially uniform dosage of from 3 to 25 pounds of toxicant per acre may be employed. In selective applications to growth media for the control of the germinant seeds and seedlings of many undesirable weeds and especially those of small seeded grasses in areas planted with the seeds of many cereal grains and broadleaf crop plants or supporting the growth of such crops, a dosage of from 10 to 50 parts by weight of toxicant per million parts by weight of soil has been found satisfactory. In selective operations for the control of the growth of the germinant seeds and seedlings of annual grasses in established stands of perennial grasses, the application of a doage of from 3 to 25 pounds of toxicant compound per acre is desirable. In all selective applications, the exact dosage to be employed is dependent upon the resistance of the cereal grains and broadleaf crop plants or their seeds or the established turf to the toxicant compounds.

The method of the present invention may be carried out by applying to the above ground portion of the plants or by applying to and mixing with growth media the unmodified 4-halo-2,6-disecondarybutyl phenols. However, the present method also embraces the employment of a liquid or dust composition containing the toxicants. In such usage the compounds may be modified with one or a plurality of additaments or herbicide adjuvants such as water, petroleum distillates or other liquid carriers; surface active dispersing agents; and finely-divided inert solids. Depending upon the concentration of toxicant, such augmented compositions are adapted to be distributed in the soil, or employed as concentrates and subsequently diluted with additional inert carrier to produce the ultimate treating compositions. The required amount of the toxicant compounds conveniently may be supplied per acre treated in from 40 to 27,000 gallons or more of the liquid carrier or in from about 50 to 2,000 pounds of the inert solid carrier.

The exact concentration of the 4-halo-2,6-disecondarybutyl phenols to be employed in compositions for application to plants or growth media is not critical and may vary considerably provided the required dosage of effective agent is supplied in the growth media or upon the above-ground surfaces of plants. The concentration of toxicant in liquid compositions employed to supply the desired dosage generally is from about 0.001 to 50 percent by weight, although concentrations as high as 90 percent by weight are sometimes employed. In dusts the concentrations of toxicant may be from 0.1 to 20 percent by weight. In compositions to be employed as concentrates, the toxicants may be present in a concentration of from 5 to 95 percent by weight.

The quantity of treating composition to be applied may vary considerably provided that the required dosage of active ingredient is applied in sufficient of the finished composition to cover adequately the vegetation to be treated or to facilitate the penetration and distribution of the active agent in growth media. The required amount of the active agent in the soil conveniently may be supplied per acre treated in from 40 to 27,000 gallons or more of the liquid carrier or in from 50 to 2,000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 2,000 pounds of finished dust per acre, the only requirement being that the required toxicant dosage be supplied in sufficient dust to achieve good coverage of the foliage.

Liquid compositions containing the desired amount of active ingredient may be prepared by dissolving the toxicants in an organic liquid or by dispersing the toxicants in water with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard's solvent. Among the latter the petroleum distillates are generally preferred. The aqueous compositions may contain one or more water immiscible solvents for the toxicant ingredient. In such compositions, the carrier comprises an aqueous emulsion, i. e. a mixture of water, emulsifying agent and water immiscible solvent. The choice of dispersing and emulsifying agent and the amount thereof employed is dictated by the nature of the composition and the ability of the agent to facilitate the dispersion of the toxicant compounds in the carrier to produce the desired composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, the active ingredient is dispersed in and on a finely-divided inert solid such as clay, talc, chalk, gypsum and the like. In such operations, the finely-divided carrier is mechanically mixed or ground with the 4-halo-2,6-disecondarybutyl phenols.

Similarly, dust compositions containing the toxicant compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surface active dispersing agents or with chalk, talc or gypsum and the like to obtain the desired amount of active ingredient in a composition adapted to be employed for the suppression of the growth of plants. Also, such dust compositions may be dispersed in water, with or without the aid of a dispersing agent, to form spray mixtures.

When operating in accordance with the present invention, growth altering amounts of 4-halo-2,6-disecondarybutyl phenols are dispersed in soil or growth media in any convenient fashion. Applications to growth media may be carried out by simply mixing with the media, by applying to the surface of soil and thereafter dragging or discing into the soil to the desired depth or by employing a liquid carrier to accomplish the penetration and impregnation. The application of spray and dust compositions to the surface of soil or to the above ground surfaces of plants may be carried out by conventional methods, e. g. power dusters, boom and hand sprayers and spray dusters.

In a further method, the distribution of the 4-halo-2,6-disecondarybutyl phenols in soil may be accomplished by introducing the agent in the water employed to irrigate the soil. In such procedures, the amount of water may be varied with the porosity and water holding capacity of the soil to obtain a desired depth of distribution of the agent.

The following examples illustrate the invention but are not to be construed as limiting the same:

*Example 1*

Twenty-five parts by weight of the 4-halo-2,6-disecondarybutyl phenols were mechanically mixed with 10 parts by weight of the dimeric alkylated aryl polyether alcohols (Triton X–155) and 65 parts of xylene to produce concentrate compositions in the form of emulsifiable liquids. Portions of these concentrates were dispersed in water to produce aqueous spray compositions containing 0.152 and 0.304 pound of one of the phenol compounds per 100 gallons of ultimate mixture. These compositions were employed for the treatment of soil areas which had been prepared and seeded with various grass species and broadleaf plants. The small seeded grass species included crab grass, German millet and Japanese millet; the cereal grains, corn and wheat; and the broadleaf plants, cotton. In the treating operations the compositions were applied to the soil areas as a soil drench and at a rate of about 0.325 acre inch of aqueous composition per acre to supply substantially uniform dosages of 40 and 20 pounds of one of the phenol compounds per acre. These dosages correspond to concentrations of about 50 and 25 parts of phenol compound per million parts by weight of soil respectively. Other areas similarly seeded with the named plant species were left untreated to serve as checks.

After three weeks the treated areas were examined to ascertain what control of the growth of seeds and emerging seedlings had been obtained. The results are set forth in the following table:

| Seed Species | Percent Control of the Growth of Seeds and Emerging Seedlings | | | |
|---|---|---|---|---|
| | 4-Chloro-2,6-Disecondarybutyl Phenol | | 4-Bromo-2,6-Disecondarybutyl Phenol | |
| | 40 Lbs. per acre | 20 Lbs. per acre | 40 Lbs. per acre | 20 Lbs. per acre |
| Crab Grass | 100 | 100 | 100 | 100 |
| German Millet | 100 | 95 | 100 | 90 |
| Japanese Millet | 95 | 95 | 90 | 70 |
| Corn | 0 | 0 | 0 | 0 |
| Wheat | 0 | 0 | 0 | 0 |
| Cotton | 10 | 0 | 0 | 0 |

At the time of observation the check areas showed vigorously growing stands of the named plant species.

*Example 2*

A portion of the emulsifiable concentrate composition containing 4-chloro-2,6-disecondarybutyl phenol as prepared in Example 1 was dispersed in water to prepare an aqueous spray composition containing 10 pounds of the phenol compound per 40 gallons of solution. This composition was applied to the foliage of plots of seedlings of crab grass and corn. At the time of the applications, the seedling plants were about one and one-half inches tall. The treatment was carried out with conventional spraying equipment and at a substantially uniform rate of 40 gallons of spray mixture per acre. Similar plots of the named plant species were left untreated to serve as checks.

After three weeks the treated plots were examined to ascertain what control of the growth of plants had been obtained. From the observation there was found a 98 percent control of crab grass with the corn being unharmed and in a state of growth and maturity comparable to the corn plants in the untreated checks.

*Example 3*

A portion of the emulsifiable concentrate composition as prepared in Example 1 and containing 4-bromo-2,6-disecondarybutyl phenol was dispersed in water to prepare an aqueous spray composition containing 10 pounds of the phenol compound per 40 gallons of ultimate mixture. This composition was applied to the foliage of plots of seedlings of crab grass, German millet, Japanese millet and corn. At the time of application the seedling plants were 1.5 inches tall. The treatment was carried out with conventional spraying equipment and at a substantially uniform rate of 40 gallons of spray mixture per acre. Similar plots of the named plant species were left untreated to serve as checks.

After three weeks, the treated plots were examined to ascertain what control of the growth of plants had been obtained. The results are set forth in the following table:

| Seedling Species | Percent Control of Growth |
|---|---|
| Crab Grass | 98 |
| German Millet | 80 |
| Japanese Millet | 80 |
| Corn | 0 |

At the time of observation the check plots supported abundant stands of the named plant species.

*Example 4*

Portions of the emulsifiable concentrate compositions as prepared in Example 1 were dispersed in water to prepare aqueous emulsion compositions containing 5 pounds of one of the phenol compounds per 40 gallons of ultimate mixture. These compositions were applied to the foliage of plots of seedlings of crab grass, sorghum, wheat, cotton and corn. At the time of the applications, the seedling plants were about 1.5 inches tall. The treatment was carried out as described in Example 3 and at a substantially uniform rate of 40 gallons of aqueous composition per acre. Similar plots of the named plant species were left untreated to serve as checks.

After three weeks, the treated plots were examined to ascertain what control of the growth of seedling plants had been obtained. The results are set forth in the following table:

| Seedling Species | Percent Control of Growth | |
|---|---|---|
| | 4-Chloro-2,6-Disecondarybutyl Phenol | 4-Bromo-2,6-Disecondarybutyl Phenol |
| Crab Grass | 90 | 90 |
| Sorghum | 0 | 0 |
| Wheat | 0 | 0 |
| Cotton | 0 | 0 |
| Corn | 0 | 0 |

At the time of observation vigorously growing stands of the named plant species were found in the check plots.

*Example 5*

Ten parts by weight of 4-chloro-2,6-disecondarybutyl phenol, 86 parts of diatomaceous earth and 4 parts of an alkylated aryl polyether alcohol (Triton X-100) are mechanically mixed and ground together to prepare a concentrate composition in the form of a wettable powder.

In another operation, 25 parts by weight of 4-bromo-2,6-disecondarybutyl phenol are mixed with 80 parts of the dioctyl ester of sodium sulfosuccinic acid (Aerosol OT) to prepare a concentrate composition in the form of a dispersible liquid.

These concentrate compositions are adapted to be dispersed in water to prepare aqueous compositions which have very desirable wetting and penetrating properties. The latter aqueous compositions are adapted to be employed to distribute the phenol compositions in growth inhibiting dosages.

*Example 6*

A portion of the emulsifiable concentrate composition as prepared in Example 1 and containing 4-chloro-2,6-disecondarybutyl phenol is dispersed in water to produce an aqueous spray composition containing 10 pounds of the phenol compound per 125 gallons of ultimate mixture. This composition is applied to the foliage of the grass in an established lawn of Kentucky blue grass and creeping red fescue which had developed a heavy infestation of common crab grass. The treatment is carried out about ten days after the first beginnings of crab grass seedling emergence in the lawn. In the treating operations, the composition is applied with a conventional sprayer and at a dosage of 125 gallons per acre. Adjacent untreated lawn areas are maintained as checks.

Five weeks and ten weeks after the application, the treated plots are critically inspected and a 90 percent control of crab grass observed. The Kentucky blue grass and creeping red fescue are unharmed by the treatments with the stands of the latter grasses being more luxuriant than in the check areas where the crab grass has flourished at the expense of the blue grass and fescue.

The term "plant part" as employed in the present specification and claims is intended to be inclusive of the stems, branches, roots, foliage and germinant seeds of plants. The expression "growth media and soil" are herein employed in their broadest sense to be inclusive of all conventional "soils" as defined in Webster's New International Dictionary, second edition, unabridged, published in 1937 by G. and C. Merriam Company, Springfield, Massachusetts. Thus, the terms refer to any substance or media in which vegetation may take root and grow, and are intended to include not only earth but compost, manure, muck, humus, and sand and the like, adapted to support plant growth.

The 4-halo-2,6-disecondarybutyl phenols as employed in accordance with the present invention may be prepared by the direct halogenation of an appropriate 2,6-disecondarybutyl phenol whereby halogen is substituted in the 4-position on the phenol compound. In such operation, the 2,6-disecondarybutyl phenol is treated with gaseous chlorine or liquid bromine at a temperature of from 25° to 60° C. Following the reaction, the desired product is separated by fractional distillation under reduced pressure. 4-chloro-2,6-disecondarybutyl phenol has a boiling point of 127° C. at 2 millimeters pressure and 4-bromo-2,6-disecondarybutyl phenol a boiling point of 170.5° C. at 10 millimeters pressure.

I claim:

1. The method which comprises exposing growing plants and plant parts to the action of a growth inhibiting amount of a member of the group consisting of 4-chloro-2,6-disecondarybutyl phenol and 4-bromo-2,6-disecondarybutyl phenol.

2. The method claimed in claim 1 wherein the phenol agent is employed in the form of a composition made up of the agent in intimate admixture with a herbicide adjuvant as a carrier therefor.

3. An agronomical practice which comprises impregnating soil with a growth inhibiting amount of a member of the group consisting of 4-chloro-2,6-disecondarybutyl phenol and 4-bromo-2,6-disecondarybutyl phenol.

4. A method for the selective control of the growth of the germinant seeds and seedlings of small seeded grasses in plantings and established stands of cereal grains and broadleaf crop plants which comprises exposing the growing plants and plant parts to the action of a member of the group consisting of 4-chloro-2,6-disecondarybutyl phenol and 4-bromo-2,6-disecondarybutyl phenol, the exposure being carried out at a dosage sufficient to control the growth of the grass without substantially injuring the cereal grains and broadleaf crop plants.

5. A method for the selective control of the growth of the germinant seeds and seedlings of small seeded grasses in plantings and established stands of cotton and corn which comprises exposing the growing plants and plant parts to the action of a member of the group consisting of 4-chloro-2,6-disecondarybutyl phenol and 4-bromo-2,6-disecondarybutyl phenol, the exposure being carried out at a dosage sufficient to control the growth of the grass without substantially injuring the cotton and corn.

6. A method for the selective control of crab grass in established stands of perennial grass which comprises applying to the foliage and soil about the crowns of the grass a compound selected from the group consisting of 4-chloro-2,6-disecondarybutyl phenol and 4-bromo-2,6-disecondarybutyl phenol, the application being carried out at a dosage sufficient to control the crab grass without substantially injuring the perennial grasses.

7. A concentrate composition comprising from 5 to 95 percent by weight of an active toxic ingredient in intimate admixture with a finely divided inert solid, the active ingredient being a member of the group consisting of 4-chloro-2,6-disecondarybutyl phenol and 4-bromo-2,6-disecondarybutyl phenol.

8. A concentrate composition comprising from 5 to 95 percent by weight of an active toxic ingredient in intimate admixture with a surface active dispersing agent, the active ingredient being a member of the group consisting of 4-chloro-2,6-disecondarybutyl phenol and 4-bromo-2,6-disecondarybutyl phenol.

9. A composition comprising an aqueous dispersion of the composition claimed in claim 8, the active ingredient being present in the amount of at least 0.001 percent by weight.

No references cited.